Figure 1:
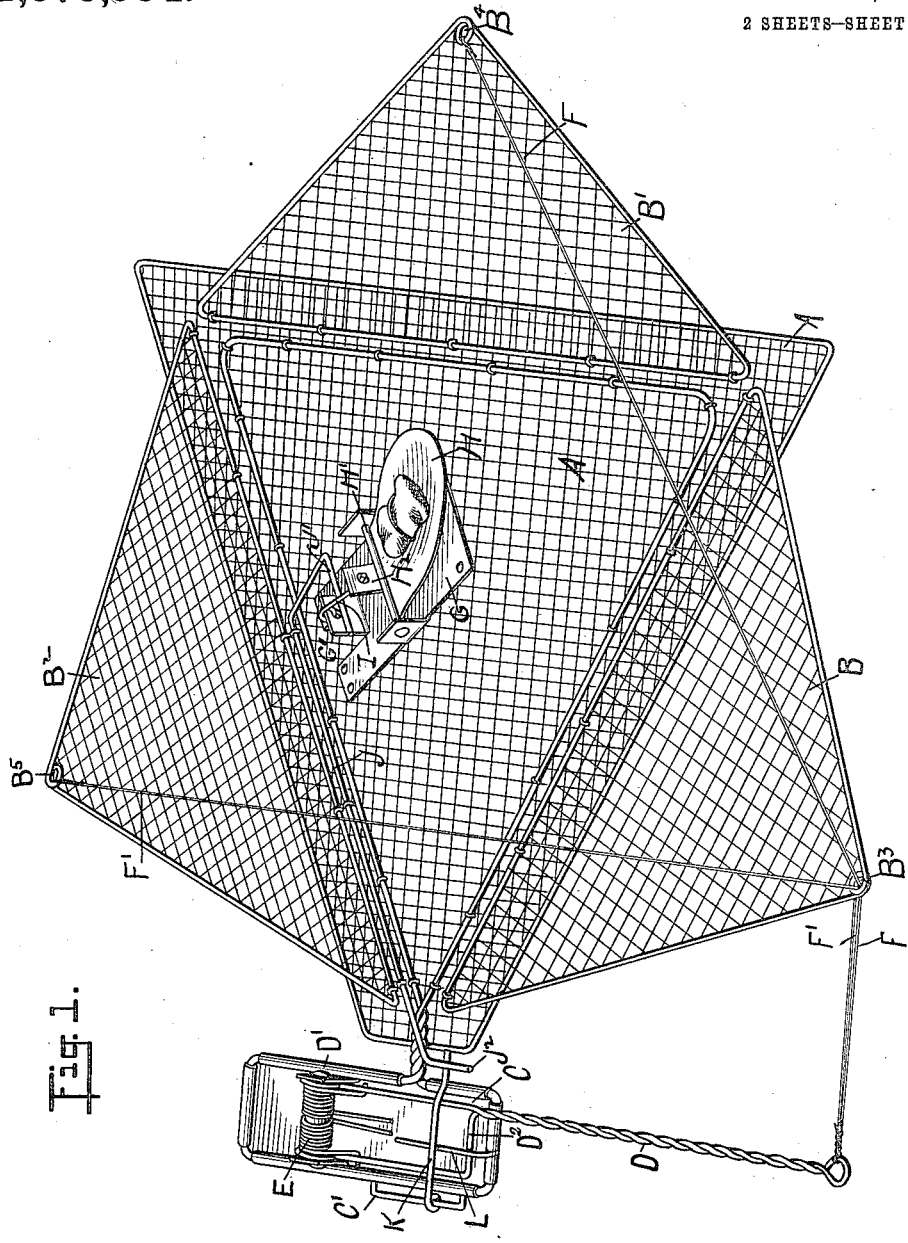

S. P. VERNER.
ANIMAL TRAP.
APPLICATION FILED DEC. 21, 1912.

1,075,954.

Patented Oct. 14, 1913.
2 SHEETS—SHEET 1.

WITNESSES

INVENTOR
SAMUEL P. VERNER,
BY
ATTORNEYS

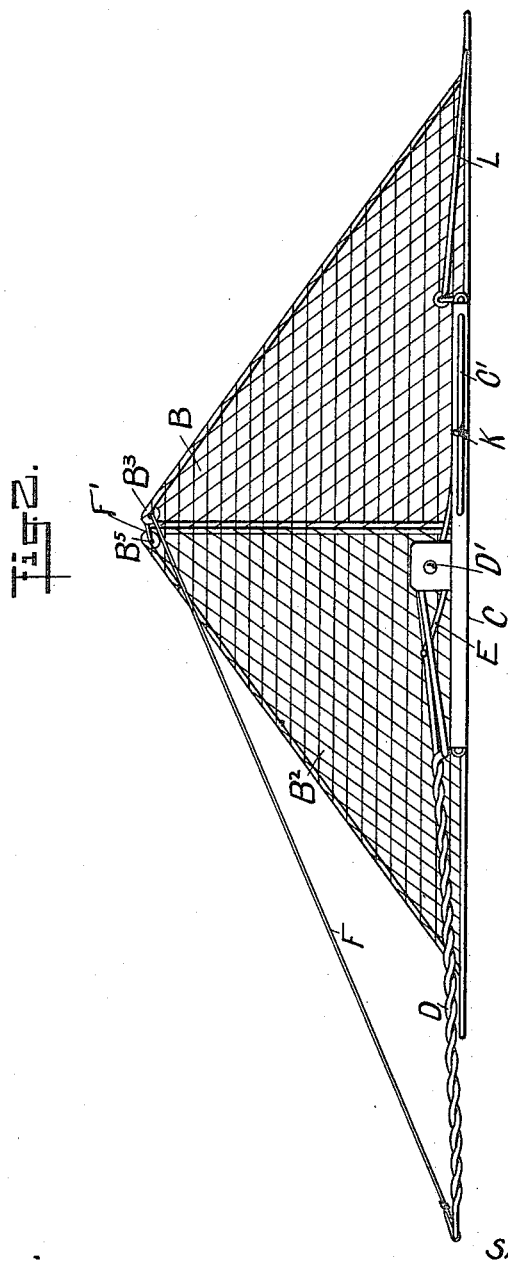

UNITED STATES PATENT OFFICE.

SAMUEL PHILLIPS VERNER, OF BAS OBISPO, CANAL ZONE.

ANIMAL-TRAP.

1,075,954.  Specification of Letters Patent.  Patented Oct. 14, 1913.

Application filed December 21, 1912. Serial No. 737,975.

*To all whom it may concern:*

Be it known that I, SAMUEL P. VERNER, a citizen of the United States, and a resident of Bas Obispo, Canal Zone, Panama, have invented a new and Improved Animal-Trap, of which the following is a full, clear, and exact description.

The object of the invention is to provide a new and improved animal trap more especially designed for caging animals alive and uninjured, and arranged to permit ready concealment, to provide access to the trap from every direction except the bottom, to prevent the escape of the animal caught, and to protect the caught animal from attack by other animals.

In order to accomplish the desired result use is made of a flat base and cage sides hinged to the margin of the base and adapted to lie flat on the ground, the sides extending outwardly from the base and when in closed position forming a peaked housing above the base. Use is also made of a bait holder on the base and actuating means controlled by the said bait holder arranged outside of the base, the actuating means being connected with the cage sides to swing the latter shut on manipulating the bait holder.

A practical embodiment of the invention is represented in the accompanying drawings forming a part of this specification, in which similar characters of reference indicate corresponding parts in both views.

Figure 1 is a perspective view of the animal trap with the parts in open position; and Fig. 2 is a side elevation of the same with the parts in closed position.

The flat base A of the animal trap is preferably made triangular in shape, and on the marginal sides of the base A are hinged the bases of the triangular cage sides B, B′ and B² adapted to swing outward and downward into open position so as to lie flat on the ground, or to swing upward or inward into closed position to form a peaked housing or a cage, as indicated in Fig. 2, it being understood that when the said cage sides B, B′ and B² are in closed position their side edges abut, as will be readily understood by reference to Fig. 2. The housing thus formed above the base A is in the shape of a three-sided pyramid. In practice, the base A and its cage sides B, B′ and B² are preferably made of wire cloth or wire netting, reinforced along the edges by reinforcing bars, as indicated in the drawings, but I do not limit myself to the particular construction of the base and sides as shown and described as the same may be made of other material or made solid, if desired.

The base A is provided at one of its corners with a frame C arranged outside of the sides B, B² when the cage sides are in open position, and on this frame C is pivoted at D′ a swing arm D pressed on by a spring E held on the frame C so as to place the arm D under tension when swung over to the right flat onto the ground and to swing this arm over to the left when the latter is released, as hereinafter more fully explained. To the free end of the arm D are secured wires, ropes, chains or other flexible connections F, F′ extending through an eye B³ formed in the apex of the side B, and the flexible connection F is attached to an eye B⁴ located at the apex of the cage side B′, the other flexible connection F′ being attached to an eye B⁵ arranged on the apex of the cage side B². The flexible connections F and F′ are so arranged that when the arm D is swung over to the right flat onto the ground then the sides B, B′ and B² can be swung outward and downward to lie flat on the ground, and when the arm D swings over from the right to the left it exerts a pull on the flexible connections F and F′ to swing the cage sides B, B′ and B² upward and inward into the closed position shown in Fig. 2.

In order to lock the arm D when under the tension of the spring E and to release the same, use is made of a locking and releasing device controlled from a baiting device arranged on the top of the base A. The baiting device consists essentially of a plate G secured to the top of the base A, and on the plate G is pivoted at H′ a bait holder H to which suitable bait is fastened, as indicated in Fig. 1. The bait holder H is provided with an apertured lug H² adapted to be engaged by a trigger I fulcrumed on a lug G′ forming part of the plate G. The trigger I is engaged at the under side by an angular arm J′ of a shaft J fulcrumed on the top of the base A adjacent the base end of the cage side B². The outer end of the shaft J is provided with an angular arm J² engaged at the under side by the free end of an arm K fulcrumed loosely on a bearing C′ forming part of the extension frame C. The arm K extends transversely over the actuating arm D and also extends over an arm L, pivoted at the right-hand side of the frame C and extending longitudinally over a cross bar D² of the arm D. Now when the several parts are in position as shown in Fig. 1 the arm D is locked in place while under the tension of the spring E by the arms L, K and J², and the shaft J is locked in place by the trigger I engaging the apertured lug H² of the bait holder H. When the several parts are in this position, the sides B, B' and B² lie flat on the ground and all the parts except the bait holder H can be covered up by leaves, paper, sand, twigs, straw, sawdust, ashes or other loose material so that only the bait remains visible, and the animal in stepping on the holder H or pulling on the bait releases the trigger I so that the arm J' is released and consequently the arm D is caused to swing from the right to the left by the action of its spring E. When the arm D is swung from the right to the left the flexible connections F, F' exert a pull on the sides B, B' and B² to swing the same shut and thus trap the animal on the base A.

The animal trap shown and described can be used for trapping various game including birds, fish and mammals, and the animals trapped are not liable to be injured, cannot escape and are protected against attack by other animals.

It will be noted that when the trap is set the several parts except the bait holder lie flat on the ground and can be readily covered as before mentioned, at the same time the trap can be approached by the animal or animals from either side and from the top.

The releasing device is very sensitive and as the sides B, B' and B² swing simultaneously upward and inward there is little chance for the animal escaping during the time the cage sides move into closed position.

The animal trap shown and described is very simple and durable in construction and composed of comparatively few parts, not liable easily to get out of order. It will also be noticed that the trap can be easily set.

Having thus described my invention, I claim as new and desire to secure by Letters Patent:

1. An animal trap, comprising a cage having a flat base and sides hinged to the base at the edges thereof, the sides being arranged to swing outward and downward to lie flat on the ground, and the sides being adapted to swing upward and inward to form a pyramidal housing over the said base, a spring-pressed arm mounted to swing, flexible connections connecting the said arm with the apexes of the said cage sides, a bait holder on the said base, and a locking and releasing device for said arm, said device being controlled by the said bait holder, locking the arm in position when the trap is set and releasing the same on manipulating the bait holder to allow the arm to swing the said cage sides into a closed position.

2. An animal trap, comprising a cage having a flat base and sides hinged to the base at the edges thereof, the sides being arranged to swing outward and downward to lie flat on the ground and the sides being adapted to swing upward and inward to form a pyramidal housing over the said base, the latter having a flat extension frame, an arm mounted to swing on the said frame, a spring pressing the said arm, flexible connections attached to the free end of the said arm and extending through the apex of one of the cage sides and connecting with the apexes of the other cage sides, a bait holder on the said base, and a locking and releasing device for the said arm, said device being controlled by the said bait holder.

3. An animal trap, comprising a cage having a flat base and sides hinged to the base at the edges thereof, the sides being arranged to swing outward and downward to lie flat on the ground and the sides being adapted to swing upward and inward to form a pyramidal housing over the said base, an operating device outside of the base, flexible connections connected with the said operating device and extending through an opening in the apex of one of the said cage sides and connecting with the apexes of the other cage sides, a bait holder on the base, and a locking and releasing mechanism for said arm, said mechanism being controlled by the said bait holder.

4. An animal trap, comprising a cage having a flat base and hinged sides adapted to lie flat on the ground and to swing upward and inward to form a housing over the base, a pivoted and spring pressed arm, flexible connections between the arm and the sides of the cage, a bait holder on the base of the cage and having a trigger, a shaft having angular arms at its ends, one of the said arms being engaged by the trigger of the bait holder, and a hinged arm adapted to extend across the pivoted and spring pressed arm and to engage the other angular arm of said shaft.

5. An animal trap, comprising a cage having a flat triangular base and hinged triangular sides adapted to lie flat on the ground and to swing inward into engagement with each other to form a pyramidal housing, a frame at one of the corners of the base outside of the sides, a pivoted and spring pressed arm mounted in the frame, flexible connections between the arm and the apexes of the sides of the cage, a bait holder on the base of the cage and having a trigger, a shaft mounted on the base and having one end extending beyond the base, said shaft having angular arms at its ends, one of the said arms being engaged by the trigger of the bait holder, and an arm pivoted to the frame and adapted to extend across the same and the pivoted and spring pressed arm and to engage the other angular arm of the said shaft.

6. An animal trap comprising a cage having a flat base and hinged sides adapted to lie flat and to swing upward and inward to form a housing, a frame at one side of the cage, a pivoted and spring pressed arm mounted in the frame, a bait holder on the base of the cage and having a trigger, a shaft mounted on the base of the cage and having angular arms at its ends, one of the arms engaging the trigger of the bait holder, an arm pivoted to the said frame and engaging a member of the pivoted and spring pressed arm, and a second arm pivoted to the frame and extending over the said arms and engaging the other angular arm of the said shaft.

In testimony whereof I have signed my name to this specification in the presence of two subscribing witnesses.

SAMUEL PHILLIPS VERNER.

Witnesses:
 THEO. C. HINCKLEY,
 E. F. NICHOLS.